Patented May 29, 1923.

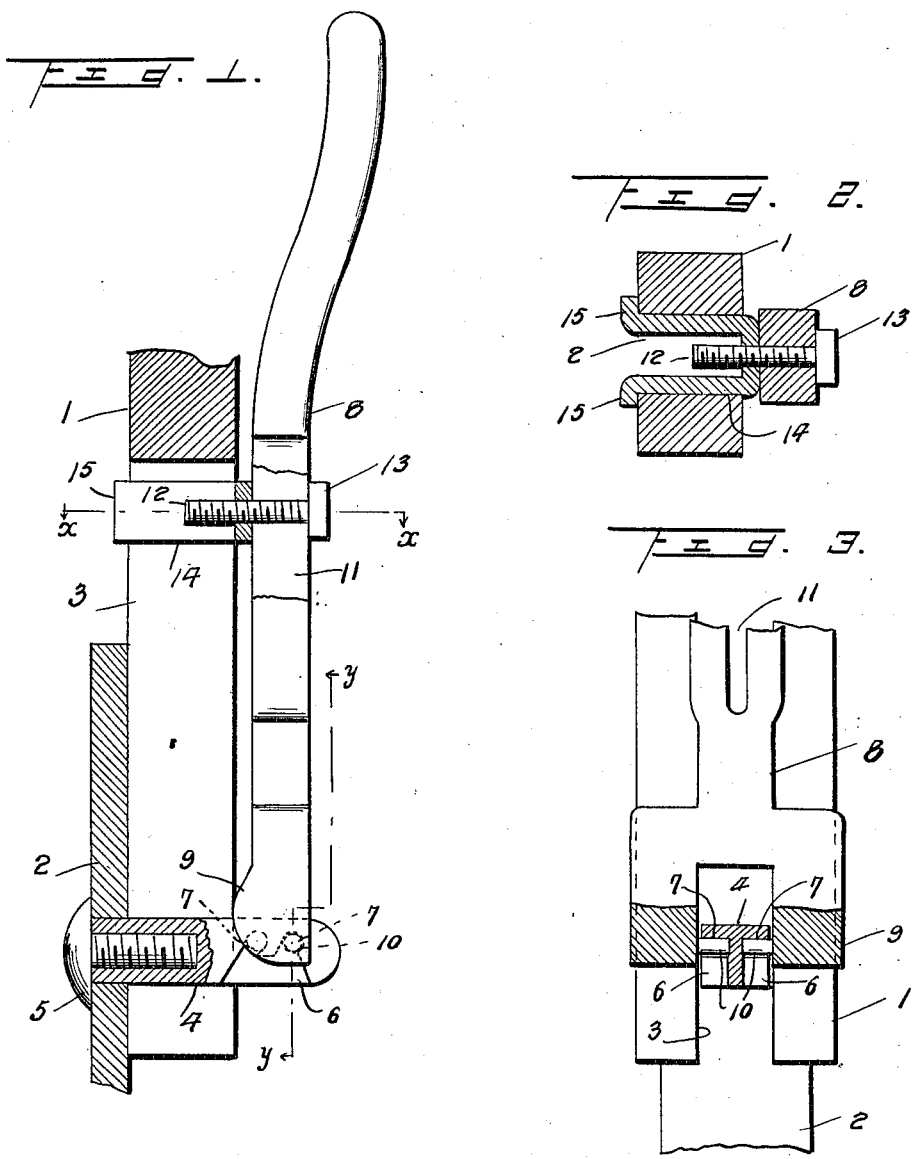

1,457,182

UNITED STATES PATENT OFFICE.

JOHN W. MALLORY AND WILLIAM M. JOHNSTON, OF GRAND SALINE, TEXAS.

CLAMP BOLT.

Application filed June 17, 1921. Serial No. 478,455.

*To all whom it may concern:*

Be it known that we, JOHN W. MALLORY, and WILLIAM M. JOHNSTON, citizens of the United States, residing at Grand Saline, in the county of Smith and State of Texas, have invented certain new and useful Improvements in Clamp Bolts; and we do hereby declare the following to be a full, clear, and exact description of the invention, such as will enable others skilled in the art to which it appertains to make and use the same.

The invention relates to fastening means designed specifically for securing shovel blades, sweeps and the like of various shapes to the standards of plows, cultivators and analogous agricultural implements.

The invention provides a fastener capable of being readily and conveniently operated for securing or releasing the parts to be fastened or detached, as required, without necessitating recourse to tools, said fastening when holding the parts in position being secure against casual displacement.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be restored to without departing from the nature of the invention.

Referring to the accompanying drawings forming a part of the specification,

Figure 1 is an elevation of the fastening in operative position, portions of a standard and shovel blade being shown in section, Figure 2 is a horizontal section on the line $x$—$x$ of Figure 1, and Figure 3 is a vertical section on the line $y$—$y$ of Figure 1, looking in the direction of the arrow.

Corresponding and like parts are referred to in the following description and designated in the several views of the drawings by like reference characters.

To demonstrate the application of the invention, portions of a standard 1 and shovel blade, sweep, or like part 2, are illustrated. The standard 1 is provided with the usual slot 3 for the reception of the fastening, whereby the part 2 is connected thereto.

The fastening means comprise a bolt 4 provided at one end with a head 5 which preferably is detachably connected thereto by means of screw threads whereby provision is had for a nicety of adjustment when adapting the fastening for the particular work in hand. Opposed recesses 6 are formed in the sides of the bolt 4 near the rear end thereof. The recesses 6 extend through the lower side of the bolt and their upper walls are provided with a plurality of notches 7 disposed lengthwise of the bolt. An operating lever 8 is formed with a cam portion 9 at one end and the cam-shaped end 9 is bifurcated to embrace opposite sides of the bolt 4. Tits or projections 10 extend inwardly from the bifurcations of the lever 8 and are adapted to enter the recesses 6 and engage the notches 7. A longitudinal slot 11 is formed in the lever 8 to receive a screw 12 having a head 13 at one end which also constitutes a stop to engage the lever 8 upon opposite sides of the slot 11 and prevent displacement of the screw 12 therefrom. A yoke 14 has its closed end threaded to receive the screw 12 and its side members formed with outer extensions 15 to engage the standard 1 upon opposite sides of the slot 3.

In the practical application of the invention, the bolt 4 is passed through an opening in the part 2 and through the slot 3 in the part 1. The lever 8 is adjusted so as to aline with the bolt 4 and with its forked end embracing opposite sides of the bolt with the tits or projections 10 entering the recesses 6 and engaging some of the series of notches 7. Upon swinging the lever 8 into upright position so as to engage the rear side of the standard 1, the cam portions 9 ride upon the parts of the standard upon opposite sides of the slot 3, thereby drawing the bolt 4 and clamping the part 2 against the part 1. Provision is had for insuring a clamping of the parts by the adjustment of the head 5 as will be readily understood. The lever 8 is made secure in clamping position by means of the yoke 14 and the screw 12. The yoke 14 is disposed in the slot 3 of the standard 1 with its outer extensions 15 engaging the parts of the standard upon opposite sides of said slot and the screw 12 passes through the slot 11 of the lever 8 and engages the threaded end of the yoke. The screw 12 is tightened to draw the lever 8 close against the standard 1 and hold it in clamping position. It will thus be understood that the fastening is made secure against possible casual displacement. When it is required to remove the part 2, the screw 12 is loosened so as to release the lever 8 and the latter is swung into horizontal position and withdrawn from engagement with the notches 7 and recesses 6. The part 2, being thus released from the clamping means, may be readily detached.

What is claimed is:

1. A fastening of the character specified comprising a bolt, a lever in cooperative relation therewith, a screw loosely engaging the lever, and anchoring means having said screw threaded therein.

2. Fastening means of the character specified comprising a bolt, an operating lever therefor, a yoke having outer extensions, and a screw loosely engaging the lever and threaded into the yoke and serving to hold the lever in the required adjusted position.

3. Fastening means of the character specified comprising a bolt, a longitudinally slotted lever in cooperative relation with the bolt, a screw passing through the slot of the lever, and a yoke having threaded engagement with the said screw.

4. Fastening means of the character specified comprising a bolt, a head having adjustable connection with the bolt, a longitudinally slotted lever having adjustable connection with the bolt, a yoke, and a screw passing through the slot of the lever and having threaded engagement with the said yoke.

5. A fastening means comprising, in combination with a slotted standard and an element adapted to be secured to the standard, a bolt passing through said element and the slot in the standard, a lever pivoted to the shank of the bolt and provided with a cam adapted to engage the standard, means carried by th lever and cooperating with the shank to limit the movement of the lever in one direction, and means cooperating with the standard and lever to prevent movement in the reverse direction.

In testimony whereof we affix our signatures in presence of two witnesses.

JOHN W. MALLORY.
WILLIAM M. JOHNSTON.

Witnesses:
L. K. KINDLE,
W. C. LITTLE.